(12) United States Patent
Nakamura et al.

(10) Patent No.: US 8,169,307 B2
(45) Date of Patent: May 1, 2012

(54) VEHICLE REAR-VIEW MIRROR (75) Inventors: Masatoshi Nakamura, Fujieda (JP);
Shinya Takayanagi, Fujieda (JP);
Atsunori Bandou, Fujieda (JP);
Yoshifumi Masuda, Makinohara (JP)

(73) Assignee: Murakami Corporation, Shizuoka (JP)

( * ) Notice: Subject to any disclaimer, the term of this patent is extended or adjusted under 35 U.S.C. 154(b) by 687 days.

(21) Appl. No.: 12/138,538

(22) Filed: Jun. 13, 2008

(65) Prior Publication Data

US 2009/0085729 A1   Apr. 2, 2009

(30) Foreign Application Priority Data

Sep. 28, 2007  (JP) ................................ 2007-255075

(51) Int. Cl.
*B60R 25/10* (2006.01)
*B60Q 1/34* (2006.01)

(52) U.S. Cl. ............... 340/426.23; 340/426.22; 340/463; 340/475

(58) Field of Classification Search ............... 340/425.5, 340/426.22, 426.23, 463, 468, 469, 472, 340/815.55, 815.56, 815.73, 475; 359/604, 359/839, 13; 362/494
See application file for complete search history.

(56) References Cited

U.S. PATENT DOCUMENTS

| | | | | |
|---|---|---|---|---|
| 5,313,335 A | * | 5/1994 | Gray et al. | 359/839 |
| 5,523,811 A | * | 6/1996 | Wada et al. | 396/429 |
| 5,760,931 A | * | 6/1998 | Saburi et al. | 359/13 |
| 6,099,154 A | * | 8/2000 | Olney | 362/494 |
| 2005/0134953 A1 | | 6/2005 | Mathieu et al. | |
| 2007/0058257 A1 | | 3/2007 | Lynam | |
| 2007/0121228 A1 | | 5/2007 | Oehmann | |
| 2009/0040778 A1 | * | 2/2009 | Takayanagi et al. | 362/494 |

FOREIGN PATENT DOCUMENTS

| | | |
|---|---|---|
| WO | 94/23968 | 10/1994 |
| WO | 2005/039925 | 5/2005 |

OTHER PUBLICATIONS

U.S. Appl. No. 12/112,048, filed Apr. 30, 2008, Takayanagi et al.

* cited by examiner

*Primary Examiner* — Van T. Trieu
(74) *Attorney, Agent, or Firm* — Greenblum & Bernstein P.L.C.

(57) ABSTRACT

To provide a vehicle rear-view mirror equipped with a display device, configured so that: a warning indication is easy to see from the driver and is hard to see from following vehicles and vehicles on the adjacent lanes; and when no warning is indicated, no discontinuities occur in the rear-area image reflected in the mirror and the warning symbol is unnoticeable. A mirror element 18 is configured by forming a semi-transmissive reflective film 24 or 56 formed of a dielectric multilayer film on the back or front surface of a transparent glass substrate 22. A dark color mask member 26 is arranged on the back surface of the mirror element 18. An opening 26*a* is formed on the mask member 26. A light-orienting tube 28 is arranged in such a manner that it protrudes in the backward direction of the mask member 26 so as to surround the opening 26*a*. The tube axis 28*a* of the light-orienting tube 28 is inclined in the direction toward the driver's viewpoint. An indication mask 32, a light diffusion plate 34 and an LED 36 are arranged as an indication light-emitting portion 30 by depositing them in this order on a rear end-side opening 28*b* of the light-orienting tube 28.

16 Claims, 6 Drawing Sheets

VEHICLE REAR-VIEW MIRROR

The disclosure of Japanese Patent Application No. JP2007-255075 filed on Sep. 28, 2007 including the specification, drawing and abstract is incorporated herein by reference in its entirety.

BACKGROUND OF THE INVENTION

1. Field of the Invention

The present invention relates to a vehicle rear-view mirror equipped with a display device that issues a warning to the driver, configured so that: when a warning is indicated, it is easy to see from the driver and is hard to see from following vehicles and vehicles on the adjacent lanes; and when no warning is indicated, no discontinuities occur in the image of the rear view and the warning symbols are unnoticeable.

2. Description of the Related Art

U.S. Pat. Nos. 5,313,335 and 6,099,154 each disclose a vehicle rear-view mirror equipped with a display device that emits warning light to the driver. U.S. Pat. No. 5,313,335 discloses a mirror having an indicator formed at a part of a surface of a mirror element, the indicator not constituting a part of the mirror surface, the mirror being configured so that when another vehicle is approaching, the indicator lights up to inform the driver of the vehicle's approach. U.S. Pat. No. 6,099,154 discloses a mirror having a mirror element formed of a semi-transmissive reflecting mirror, the mirror being configured so that indication masks with particular warning symbols drawn as transmissive patterns are arranged on the back surface of the mirror element, light sources are arranged behind the indication masks, and when a warning is necessary, a light source lights up to emit light for indicating a warning symbol through the semi-transmissive reflecting mirror, thereby informing the driver of the warning.

The mirror disclosed in U.S. Pat. No. 5,313,335 has a problem in that when no warnings are indicated (i.e., when the lights are put off), the rear-area image reflected in the mirror surface has discontinuities because the indicator does not constitute a part of the mirror surface, resulting in a poor design, and also in a narrow mirror surface area, causing a narrow range of vision. In the mirror disclosed in U.S. Pat. No. 6,099,154, the indication can easily be seen from any direction, which is obtrusive and accordingly provides a feeling of discomfort to following vehicles and vehicles on the adjacent lanes. Also, when no warnings are indicated, the warning symbols can easily be seen through the semi-transmissive reflecting mirror, which is obtrusive to the driver. In particular, the indication symbols are highly noticeable when light sources which are not of dark colors during the lights being put off are used or when a light diffusion plate of a white color is arranged between the light sources and the indication masks.

The present invention has been made in view of the aforementioned points, and aims to provide a vehicle rear-view mirror configured so that: when a warning is indicated, it is easy to see from the driver and is hard to see from following vehicles and vehicles on the adjacent lanes; and when no warning is indicated, no discontinuities occur in the image of the rear view and the warning symbols are unnoticeable.

SUMMARY OF THE INVENTION

The present invention comprises: a mirror element having a semi-transmissive reflective film on one surface of a transparent substrate; a dark color mask member having an opening in a surface thereof, the mask member being arranged over an entire region excluding the opening or at a necessary region excluding the opening, on a back side of the mirror element; a dark color light-orienting tube arranged so that it protrudes backward from a back side of the mask member, a front end-side opening of the light-orienting tube being communicatively connected to the opening of the mask member on a same axis, the axis of the tube being arranged so that it is inclined relative to the mirror element in a direction toward a driver's viewpoint, the tube being of a dark color on an inner side; an indication mask of, for example, a dark color arranged outside or inside the light-orienting tube at a back portion of the tube, in which a warning symbol expressing the content of a particular warning is drawn as a transmissive pattern; a light source arranged behind the indication mask, and in the present invention, light emitted from the light source is formed into indication light having the pattern of the warning symbol by making the light pass through the indication mask; and the indication light is guided to the driver's viewpoint by making the light pass through the light-orienting tube and the opening of the mask member and further pass through the mirror element. In the present invention, "dark color" refers to black or other dark colors close to black.

According to the present invention, since the light-orienting tube is arranged so that it is inclined in the direction toward the driver's viewpoint, when a warning is indicated, it is easy to see from the driver and is hard to see from following vehicles and vehicles on the adjacent lanes. Also, since the light source and the indication mask are arranged outside or inside the light-orienting tube at the back portion of the tube, when no warning is indicated, the warning symbol is unnoticeable. Also, when no warning is indicated, the indicator (indication part) becomes a part of the mirror surface, causing no discontinuities in the image of the rear view reflected in the mirror surface.

In the present invention, the angle between the axis of the light-orienting tube and the surface of the mirror element can be, for example, 30° to 80°. The area of the front end-side opening of the light-orienting tube in the direction perpendicular to the axis can be larger than the area of the rear end-side opening in the direction perpendicular to the axis. This makes it possible for the driver to see the indication even though the position of the driver's viewpoint moves in some degree. The front shape of the opening in the mask member is unnoticeable if it is made to be, for example, a simple geometric shape, such as a circle, an oval or an elliptic, which can avoid obtrusiveness even if the opening is seen through in some degree when no warning is indicated. If the light-orienting tube is molded integrally with the mask member or a mirror holder arranged behind the mask member, the number of components can be reduced, easy assembly can be made possible.

Also, in the present invention, it is possible that: the mirror element has the semi-transmissive reflective film formed of a dielectric multilayer film, the mirror element has a characteristic that exhibits one reflection peak in the visible light range; and indication light entering the mirror element has a light intensity peak in a band in which the transmittance of the mirror element is higher than the reflectance of the mirror element. This makes it possible to provide both visibility of the rear-area image and that of the indication. More specifically, the reflection color of the mirror element may be a bluish color, and the indication light entering the mirror element may be red.

Also, in the present invention, when the light source is an LED (light-emitting diode), it is possible to indicate the entire warning symbol with a uniform brightness by means of arranging a light diffusion plate between the light source and the indication mask. Also, when the light source is a white light (white lamp), it is possible to arrange a band-pass filter, which allows light in a particular band to pass through, and a light diffusion plate between the light source and the indication mask. Also, when the light source is an EL (electroluminescence) element, since the EL element itself can indicate the entire warning symbol with a uniform brightness, it is possible to eliminate the use of the light diffusion plate. Also, since the EL element can emit light in a particular band, it is also possible to eliminate the use of the band-pass filter.

DETAILED DESCRIPTION OF THE PREFERRED EMBODIMENTS

Figure 2:
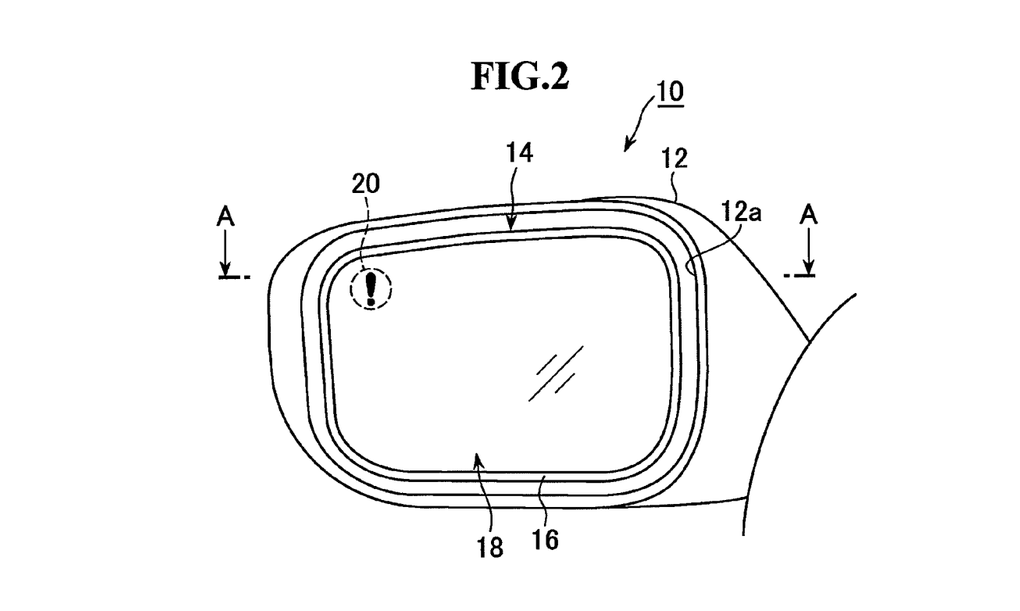
FIG. 2 is a diagram illustrating an outer mirror (left-side door mirror) to which the present invention has been applied, viewed from the driver's viewpoint, which is common for the respective embodiments, the diagram showing the state in which a warning symbol is indicated by means of light emitting in an indicator 20.
Figure 3A:
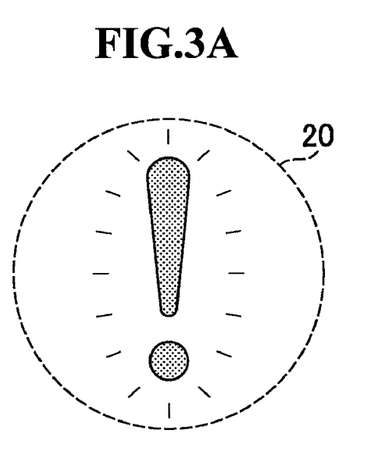
FIGS. 3A and 3B are diagrams each illustrating a specific example of an indication pattern indicated by means of light emitting in an indicator 20 shown in FIG. 2, and are diagrams in which the indication light is viewed from the driver's viewpoint.
Figure 3B:
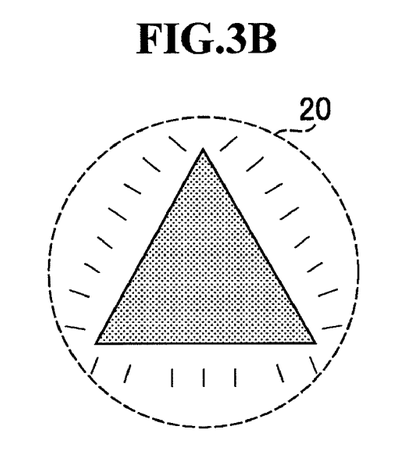

FIG. 2 is a front view of an outer mirror (left-side door mirror) to which the present invention has been applied. An outer mirror 10 has a mirror body 14 arranged in an opening 12a of a mirror housing 12. The mirror body 14 is formed by putting the mirror element 18 into the front portion of a mirror holder 16. The entire surface of the mirror element 18 is formed of a semi-transmissive reflecting mirror. At a region in the vicinity of the peripheral edge in the plate surface of the mirror element 18 (the upper left portion in the example shown in FIG. 2), an indicator 20 (an indication part) is formed. A light signal having an indication pattern of a warning symbol expressing the content of a particular warning, which is issued from an indication light-emitting portion arranged behind the indicator 20, passes through the mirror element 18 and is emitted from the indicator 20 in the direction toward the driver's viewpoint. This warning indication can be used for, for example, informing the driver of an approaching vehicle, and in that case, the warning symbol may have, for example, an indication pattern shown in FIG. 3A or 3B (the region provided with black dots lights up). When the indication is used for informing the driver of an approaching vehicle, the indication light-emitting portion automatically lights up when a sensor mounted in the vehicle detects an approaching vehicle. The lighting of the warning symbol can be switched between "continues lighting" and "blinking" depending on the brightness of the surroundings. In other words, in a bright condition in a sunny day, even if the warning symbol lights up, it may be hard to be noticeable and may not be noticed by the driver. As a countermeasure for it, the luminance of the light source may be increased, but in that case, indication light may provide the feeling of glare to the driver at night or in a cloudy day, obstructing the driver s safe driving. Therefore, the luminance of the light source is selected so that the brightness of the indication light is proper at night or a cloudy day, and also the brightness of the surrounding light is detected by an optical sensor to make the indication light enter the state of "continuous lighting" when the brightness of the surrounding light is no more than a predetermine value (which corresponds to night time or a cloudy day), and makes the indication light enter the state "blinking" when the brightness of the surrounding light exceeds the predetermined value, (which corresponds to a sunny day).

Hereinafter, various embodiments of an inner structure of the mirror body 14 will be described with reference to cross-sectional views of FIG. 2 taken along a line indicated by arrows A-A.

<<Embodiment 1>>

Figure 1:
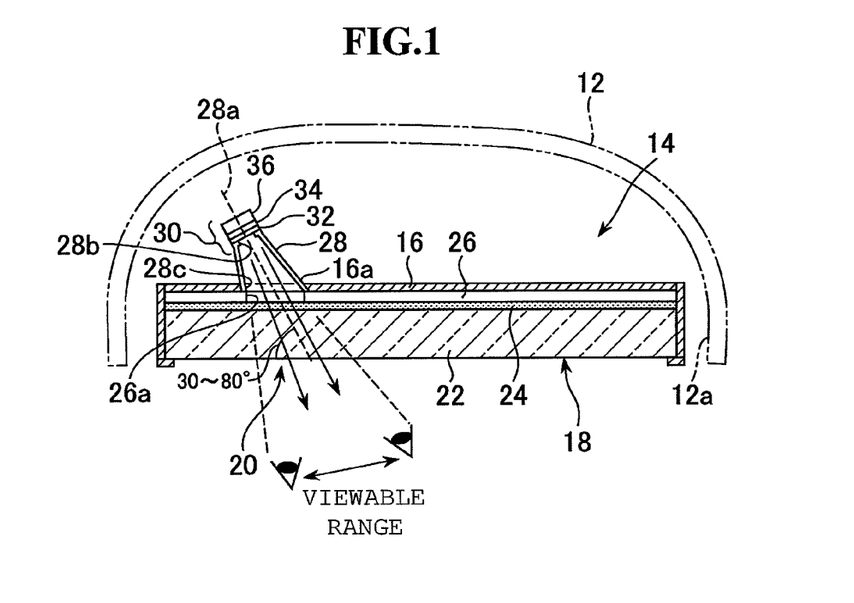
FIG. 1 is a diagram illustrating Embodiment 1 of the present invention, which is a cross-sectional view of FIG. 2 taken along a line indicated by arrows A-A.

Embodiment 1 of the Present Invention is Shown in FIG. 1. A mirror element 18 is configured by forming a semi-transmissive reflective film 24 formed of a dielectric multilayer film on the entire back surface of a transparent glass substrate 22. At the entire region behind the mirror element 18 excluding an opening 26a, which will be described later, a dark color mask member 26 is arranged. The mask member 26 is intended to prevent the inside of the mirror from being seen through from outside, and can be formed by, for example, a resin plate, a resin film or a coating material (paint), all of which are of dark colors (for example, black). The mask member 26 and the mirror element 18 are put into the front portion of the mirror holder 16 formed of, for example, a dark color (for example, black) resin, thereby the mirror body 14 having an integral structure. When the mask member 26 is formed of a resin plate or a resin film, the mirror element 18 and the mask member 26 can be attached to each other using a transparent bond or a transparent adhesive. However, when the mask member 26 and the mirror element 18 are individually put into the mirror holder 16 in this order, these mirror element 18 and mask member 26 may be integrated, and accordingly it is not essential to attach the mirror element 18 and the mask member 26 to each other.

At the mask member 26, the opening 26a is formed at the position corresponding to the indicator 20. At the mirror holder 16, also, an opening 16a is formed at the position corresponding to that of the opening 26a. A light-orienting tube 28 surrounding and thereby occluding the opening 26a and projecting backward is connected to the back surface of the mask member 26. A front end-side opening 28c of the light-orienting tube 28 has the same dimensions as those of the opening 26a of the mask member 26, and these openings are communicatively connected to each other. The light-orienting tube 28, which exhibits a dark color (for example, black) on the inner side, can be formed of, for example, a dark color (for example, black) resin. When the mask member 26 is formed of a resin plate, it is possible to form the mask member 26 and the light-orienting tube 28 as an integrally-molded product using the same resin material. Also, it is possible to form the mask member 26 and the light-orienting tube 28 as separate components and connect them by bonding. Also, instead of connecting the light-orienting tube 28 to the mask member 26, it is possible to connect the light-orienting tube 28 to the mirror holder 16. In this case, if the mirror holder 16 is formed of a resin plate, it is possible to form the mirror holder 16 and the light-orienting tube 28 as an integrally-molded product using the same resin material. Alternatively, it is possible to form the mirror holder 16 and the light-orienting tube 28 as separate components and connect them by bonding.

The light-orienting tube 28 is arranged so that the tube axis 28a is inclined relative to the surface of the mirror element 18 in the direction toward the driver's viewpoint. The angle between the axis 28a of the light-orienting tube 28 and the surface of the mirror element 18 is 30° to 80°. The cross-sectional shape of the light-orienting tube 28 in the direction perpendicular to the axis is a circle. The diameter of this circle becomes smaller on the rear end side of the light-orienting tube 28 and becomes larger on the front end side. In other words, the light-orienting tube 28 becomes wider toward the opening 26a of the mask member 26. As a result, a viewable range of a predetermined angle in upward and downward directions and leftward and rightward directions from the driver's viewpoint can be secured, making it possible for the driver to see an indication even though the position of the driver's viewpoint moves in some degree. Since the light-orienting tube 28 having a circular shape in cross section is connected to the opening 26a of the mask member 26 in such a manner that it is inclined, the end surface shape of the front end-side opening 28c of the light-orienting tube 28 is a horizontally-long oval, and in order to conform to this, the opening 26a of the mask member 26 is also formed in the shape of a horizontally-long oval (the opening 26a is circular when it is seen from the direction of the axis 28a of the light-orienting tube 28). The rear-end surface of the light-orienting tube 28 is perpendicular to the axis 28a. At this rear-end surface, a circular opening 28b is formed. The area of the front end-side opening 28c of the light-orienting tube 28 in the direction perpendicular to the axis is larger than the area of the rear end-side opening 28b in the direction perpendicular to the axis. On the outside of the rear end of the light-orienting tube 28, an indication mask 32, a light diffusion plate 34 and an LED 36 are arranged as an indication light-emitting portion 30 by depositing them in this order. The rear end-side opening 28b of the light-orienting tube 28 is occluded by the indication light-emitting portion 30. The optical axis of the indication light-emitting portion 30 corresponds to the axis 28a of the light-orienting tube 28. The indication mask 32 can be configured as a transmissive pattern formed by cutting, for example, an opaque resin plate (for example, a resin plate of a dark color such as black) into the shape of an indication pattern such as the aforementioned one shown in FIG. 3A or 3B. The light diffusion plate 34 acts so as to make light from the LED 36 uniformly diffuse over the entire indication pattern in the indication mask 32.

According to the aforementioned configuration, light emitted from the LED 36 is diffused by the light diffusion plate 34, formed into a predetermined indication pattern by indication mask 32, passes through the light-orienting tube 28 and the opening 26a, and also passes through the semi-transmissive reflective film 24 and the transparent glass substrate 22, and is emitted with its angle limited to the direction toward the driver's viewpoint. Accordingly, the light-emitting indication is easy to see from the driver and is also hard to see from following vehicles and vehicles on the adjacent lanes. Also, when no warning is indicated (i.e., when the light is put off), the indication pattern in the indication mask 32 is not seen through because the indication light-emitting portion 30 is located at the back portion of the light-orienting tube 28. Also, since the opening 26a itself has a simple geometric shape (in this example, the shape viewed from the driver is a circle), it is more unnoticeable than the case where a warning symbol evoking a particular notion is seen through, even though it is seen through in some degree. It is also unnoticeable when the shape of the opening 26a viewed from the driver is made to be an elliptic or an oval other than a circle.

Figure 4:
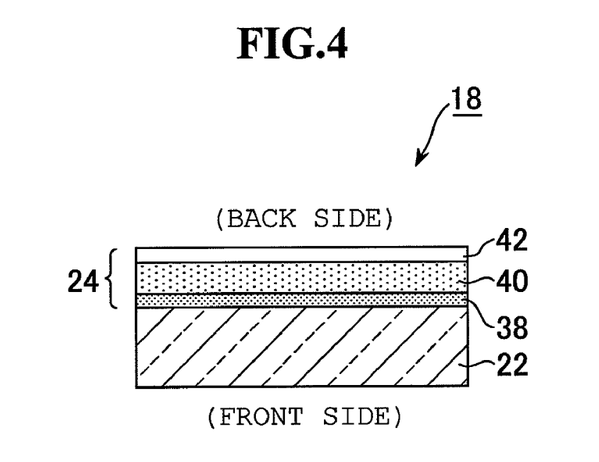
FIG. 4 is a cross-sectional view of a mirror element 18 schematically illustrating a film configuration of a semi-transmissive reflective film 24 shown in FIG. 1.
Figure 5:
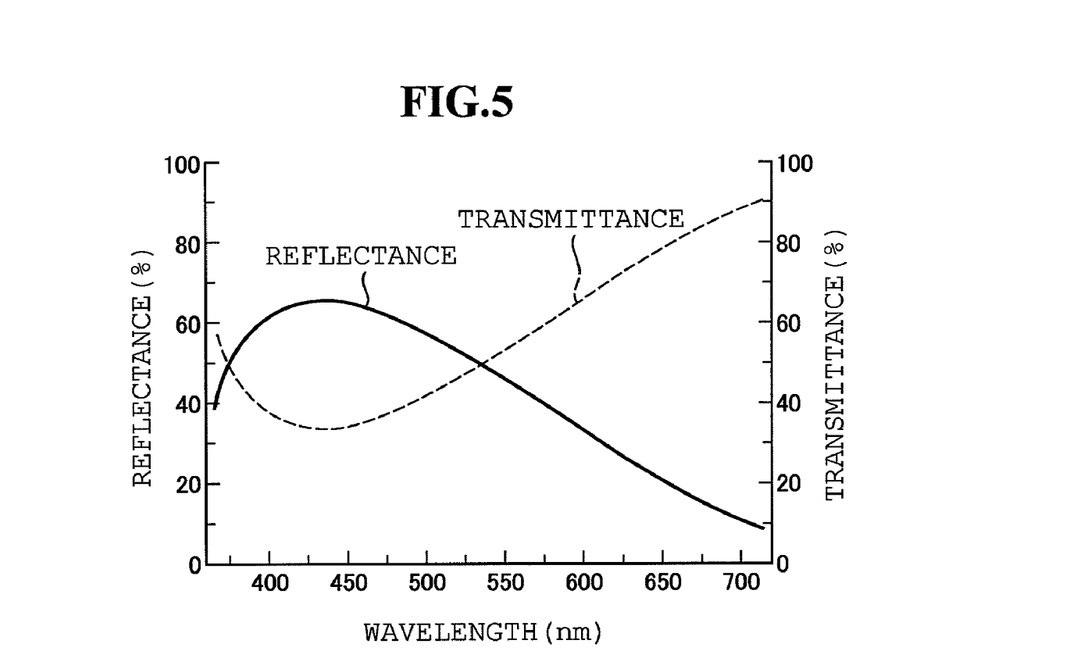
FIG. 5 is a graph indicating the reflectance characteristics and the transmittance characteristics of a mirror element 18 shown in FIG. 4.

Here, an example configuration of the semi-transmissive reflective film 24 will be described. FIG. 4 schematically illustrates a film configuration of the semi-transmissive reflective film 24. The transparent glass substrate 22 is formed of, for example, a soda-lime glass with a thickness of 1.9 mm. On the back surface of the transparent glass substrate 22, the semi-transmissive reflective film 24 is formed. The semi-transmissive reflective film 24 is formed of a dielectric multilayer film obtained by sequentially depositing three films, i.e., a high refractive index material film 38, a low refractive index material film 40 and a high refractive index material film 42, on the back surface of the transparent glass substrate 22. The optical film thickness of each of the respective films 38, 40 and 42 is $\lambda/4$ ($\lambda$: reference wavelength). FIG. 5 shows the reflectance characteristics and the transmittance characteristics of the mirror element 18 shown in FIG. 4 when the high refractive index material films 38 and 42 are each formed of $TiO_2$ and the low refractive index material film 40 is formed of $SiO_2$. In this design, the reference wavelength $\lambda$ is set to 430 nm. The characteristics shown in FIG. 5 exhibit one reflection peak in the visible light range. According to these characteristics, the reflectance necessary for a vehicle mirror can be obtained. The reflection color is a bluish color. When a red LED (with a light emission wavelength of around 650 nm) as the LED 36 is combined with this design, since the transmittance of the mirror element 18 for this red light is no less than 70%, which is high, the driver can sufficiently see a light-emitting indication even though the output of the light emitted from the LED 36 is not so high.

<<Embodiment 2>>

Figure 6:
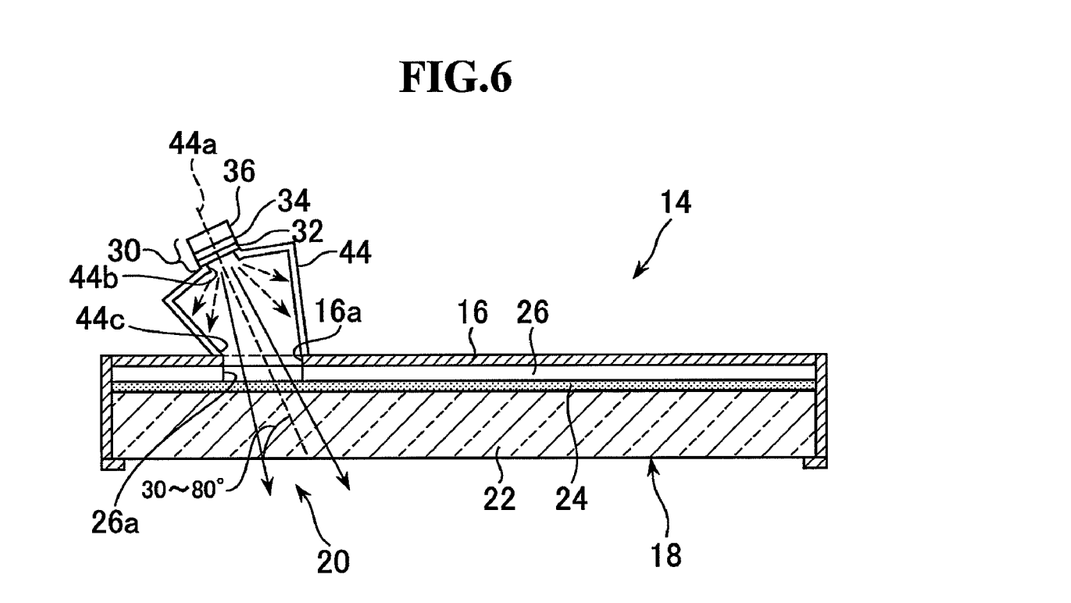
FIG. 6 is a diagram illustrating Embodiment 2 of the present invention, which is a cross-sectional view of FIG. 2 taken along a line indicated by arrows A-A.

Embodiment 2 of the Present Invention is Shown in FIG. 6. This is formed by altering the structure of the light-orienting tube in Embodiment 1 (FIG. 1). The parts in common to those in FIG. 1 are provided with the same reference numerals. Here, a light-orienting tube 44 is connected to a mirror holder 16. The light-orienting tube 44 is of a dark color (for example, black) on the inner side. It is also possible to form the mirror holder 16 and a light-orienting tube 44 as an integrally-molded product using the same resin material. The light-orienting tube 44 bulges outwardly at an intermediate portion in the direction of the tube axis 44a, and the cross section of the light-orienting tube 44 cut by a plane passing through the axis 44a is hexagonal as shown in FIG. 6. The cross section of the light-orienting tube 44 in the direction perpendicular to the axis 44a is circular. A front end-side opening 44c of the light-orienting tube 44 has a horizontally-long oval shape having the same dimensions as those of an opening 16a of the mirror holder 16 and those of an opening 26a of a mask member 26, and they are communicatively connected to each other. As a result, the light-orienting tube 44 surrounds and thereby occludes the opening 16a of the mirror holder 16 and the opening 26a of the mask member 26. The rear-end surface of the light-orienting tube 44 is perpendicular to the axis 44a. At this rear-end surface, a circular opening 44b is formed. This rear end-side opening 44b is occluded by an indication light-emitting portion 30. The optical axis of the indication light-emitting portion 30 corresponds to the axis 44a of the light-orienting tube 44. The area of the front end-side opening 44c of the light-orienting tube 44 in the direction perpendicular to the axis is larger than the area of the rear end-side opening 44b in the direction perpendicular to the axis. The rest of the configuration is the same as that shown in FIG. 1. This light-orienting tube 44 structure makes it harder for light reflected on the inner surface of the light-orienting tube 44 to be emitted in the direction toward the driver's viewpoint, compared to the structure shown in FIG. 1, and accordingly it makes it easy to see a light-emitting indication.

<<Embodiment 3>>

Figure 7:
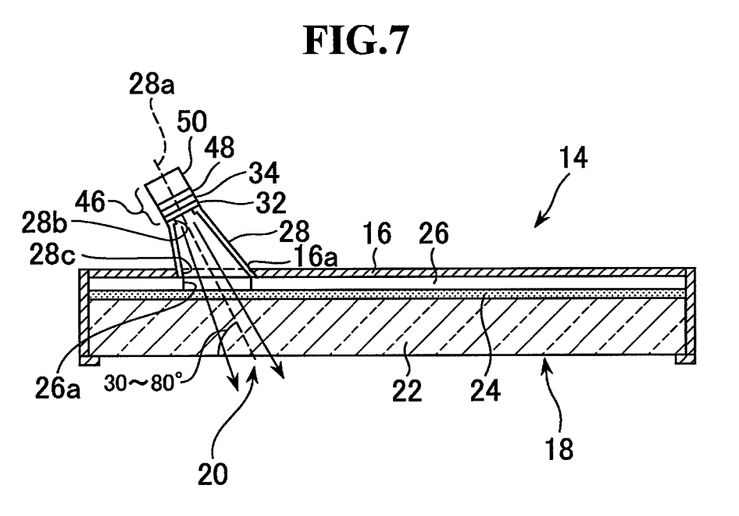
FIG. 7 is a diagram illustrating Embodiment 3 of the present invention, which is a cross-sectional view of FIG. 2 taken along a line indicated by arrows A-A.

Embodiment 3 of the Present Invention is Shown in FIG. 7. This is formed by altering the light source type from an LED to a white lamp in Embodiment 1 (FIG. 1). The parts in common to those in FIG. 1 are provided with the same reference numerals. On the outside of the rear-end portion of the light-orienting tube 28, an indication mask 32, a light diffusion plate 34, a band-pass filter 48 and a white lamp 50 are arranged as an indication light-emitting portion 46 by depositing them in this order. In the band-pass filter 48, the central wavelength of its transmission band is set to a band that is away from the peak wavelength of the reflection band of a mirror element 18 (i.e., a band in which the transmittance is higher than the reflectance). For example, when the mirror element 18 has the aforementioned characteristics shown in FIG. 5, the central wavelength of the transmission band of the band-pass filter 48 can be set to a red-color band. Accordingly, light with wavelengths in a particular band (i.e., a band in which the transmittance of the mirror element 18 is high) in white light emitted from the white lamp 50 is guided to the driver's viewpoint through the band-pass filter 48 and further through the mirror element 18.

<<Embodiment 4>>

Figure 8:
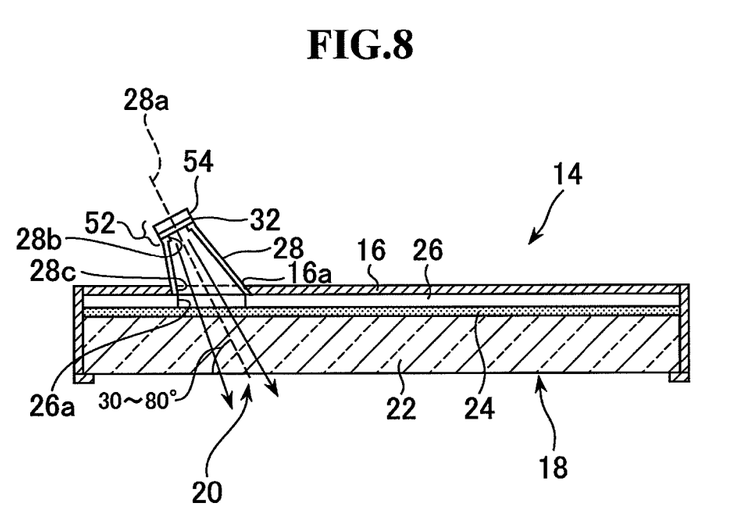
FIG. 8 is a diagram illustrating Embodiment 4 of the present invention, which is a cross-sectional view of FIG. 2 taken along a line indicated by arrows A-A.

Embodiment 4 of the Present Invention is Shown in FIG. 8. This is formed by altering the light source type from an LED to an EL element in Embodiment 1 (FIG. 1). The parts in common to those in FIG. 1 are provided with the same reference numerals. On the outside of the rear-end portion of the light-orienting tube 28, an indication mask 32 and an EL element 54 are arranged as an indication light-emitting portion 52 by depositing them in this order. Since the entire surface of the EL element 54 uniformly emits light, a light diffusion plate is not required. Furthermore, since the EL element 54 emits light in a particular wavelength band, a band-pass filter is also not required. Furthermore, since the EL element can be formed so as to have a large light-emitting area, even though the area of an indication symbol in the indication mask 32 is large, it is possible to make the entire indication symbol emit light by using the EL element 54 of the corresponding size. The central wavelength of light emitted by the EL element 54 is set to a band that is away from the peak wavelength of the reflection band of the mirror element 18 (a band in which the transmittance is higher than the reflectance). For example, where the mirror element 18 has the aforementioned characteristics shown in FIG. 5, the central wavelength of light emitted from the EL element 54 can be set to be in a red-color band. As a result, light emitted from the EL element 54 is guided to the driver's viewpoint through the mirror element 18.

<<Embodiment 5>>

Figure 9:
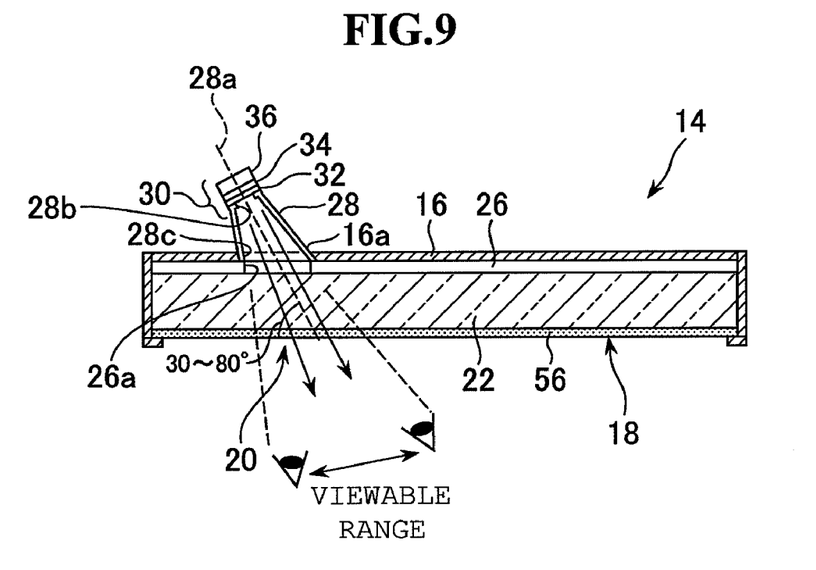
FIG. 9 is a diagram illustrating Embodiment 5 of the present invention, which is a cross-sectional view of FIG. 2 taken along a line indicated by arrows A-A.

Embodiment 5 of the present invention is shown in FIG. 9. This is formed by using a front surface mirror (a mirror with a reflective film arranged on the front surface side of the substrate) for a mirror element 18 in Embodiment 1 (FIG. 1). The parts in common to those in FIG. 1 are provided with the same reference numerals. The mirror element 18 is configured by forming a semi-transmissive reflective film 56 formed of a dielectric multilayer film over the entire front surface of a transparent glass substrate 22. A mask member 26 is provided over the entire region behind the mirror element 18 excluding an opening 26a. The mask member 26 and the mirror element 18 are put into the front portion of the mirror holder 16 formed of, for example, a dark color (for example, black) resin, thereby a mirror body 14 having an integral structure. The mask member 26 and the mirror element 18 can be attached to each other using a bond or an adhesive, or can also be left unattached.

Figure 10:
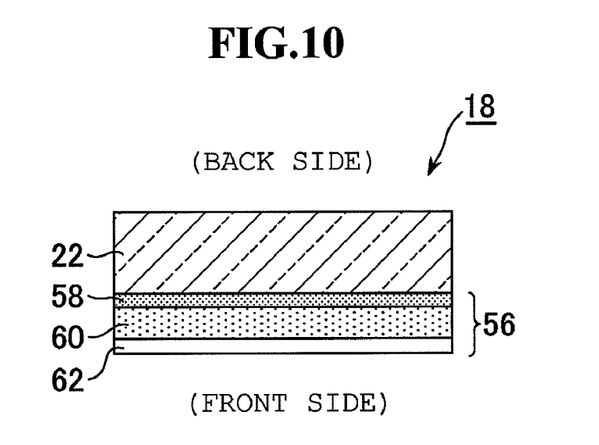
FIG. 10 is a cross-sectional view of a mirror element 18 schematically illustrating a film configuration of a semi-transmissive reflective film 56 shown in FIG. 9.
Figure 11:
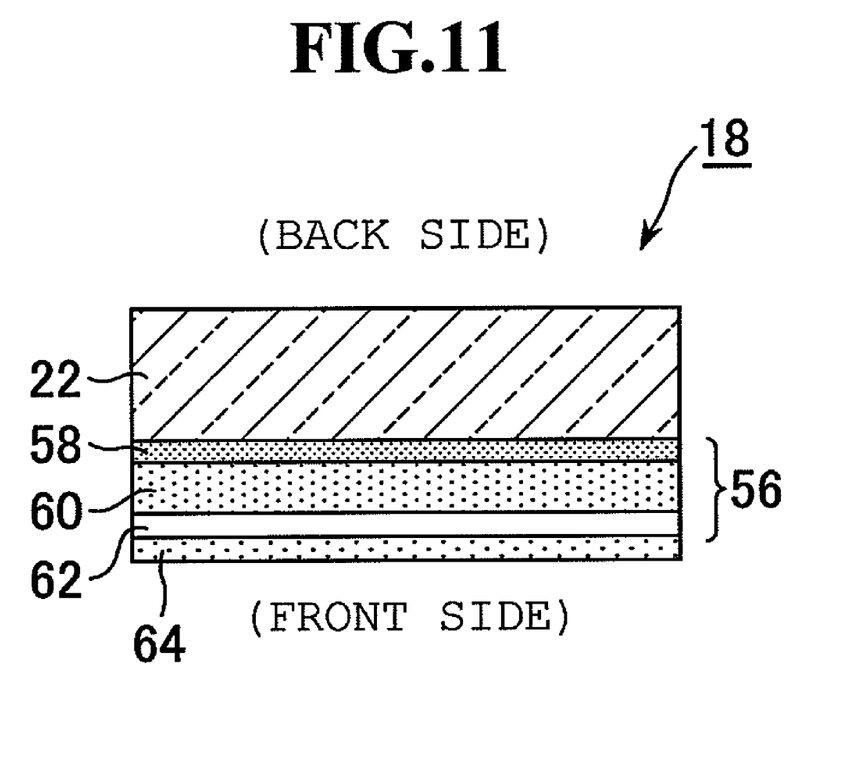
FIG. 11 is a cross-sectional view of a mirror element 18 schematically illustrating another film configuration of a semi-transmissive reflective film 56 shown in FIG. 9.

Here, an example configuration of the semi-transmissive reflective film 56 will be described. FIG. 10 schematically shows a film configuration of the semi-transmissive reflective film 56. The transparent glass substrate 22 is configured of, for example, a soda-lime glass with a thickness of 1.9 mm. On the front surface of the transparent glass substrate 22, a semi-transmissive reflective film 56 is formed. The semi-transmissive reflective film 56 is formed of a dielectric multilayer film obtained by sequentially depositing three layers, i.e., a high refractive index material film 58, a low refractive index material film 60 and a high refractive index material film 62 on the front surface of the transparent glass substrate 22. The optical film thickness of each of the respective layers 58, 60 and 62 is $\lambda/4$ ($\lambda$: reference wavelength). For each of the layers 58, 60 and 62, it is possible that, for example, the high refractive index material film 58 and 62 are formed of $TiO_2$ respectively and the low refractive index material film 60 is formed of $SiO_2$. It is possible to provide hydrophilicity if the forefront surface of the high refractive index material film 62 is formed of photocatalytic $TiO_2$. Also, as shown in FIG. 11 (the parts in common to those in FIG. 10 are provide with the same reference numerals), it is possible that the high refractive index material film 62 is formed of photocatalytic $TiO_2$ and that a porous $SiO_2$ film 64 having a film thickness of no more than 20 nm is deposited on the front surface of the film 62 to provide a function that maintains the hydrophilicity.

In each of the aforementioned embodiments, although the indication light-emitting portion 30, 46 or 52 is arranged outside the light-orienting tube 28 or 44 at the back portion of the tube, it is also possible that it is arranged inside the light-orienting tube 28 or 44 at the back portion of the tube. Also, in the above embodiments, although the mask member 26 is provided over the entire region behind the mirror element 18 excluding the opening 26a, it is not essential in the present invention that the mask member 26 is provided over the "entire" region behind the mirror element 18 excluding the opening 26a, and depending on the mirror design, it is also possible to provide the mask member 26 only at a necessary region behind the mirror element 18 excluding the opening 26a. Furthermore, although each of the above embodiments have described the case where the present invention is applied to a left-side door mirror, it is also possible to apply the present invention to a right-side door mirror. Also, it is possible to apply the present invention to an inner mirror.

What is claimed is:
1. A vehicle rear-view mirror, comprising:
a mirror element having a semi-transmissive reflective film on one surface of a transparent substrate;

a dark color mask member having an opening in a surface thereof, the mask member being arranged over an entire region excluding the opening or at a necessary region excluding the opening, on a back side of the mirror element;

a dark color light-orienting tube arranged so that it protrudes backward from a back side of the mask member, a front end-side opening of the light-orienting tube being communicatively connected to the opening of the mask member on a same axis, the axis of the tube being arranged so that it is inclined relative to the mirror element in a direction toward a driver's viewpoint, the tube being of a dark color on an inner side;

an indication mask, arranged outside or inside the light-orienting tube at a back portion of the tube, in which a warning symbol expressing the content of a particular warning is drawn as a transmissive pattern;

a light source arranged behind the indication mask, wherein:

light emitted from the light source is formed into indication light having the pattern of the warning symbol by making the light pass through the indication mask; and the indication light is guided to the driver's viewpoint by making the light pass through the light-orienting tube and the opening of the mask member and further pass through the mirror element.

2. The vehicle rear-view mirror according to claim 1, wherein the angle between the axis of the light-orienting tube and a surface of the mirror element is 30° to 80°.

3. The vehicle rear-view mirror according to claim 2, wherein the area of the front end-side opening of the light-orienting tube in a direction perpendicular to the axis is larger than the area of an rear end-side opening of the light-orienting tube in a direction perpendicular to the axis.

4. The vehicle rear-view mirror according to claim 3, wherein the inner diameter of the light-orienting tube gradually becomes larger from the rear end side to the front end side.

5. The vehicle rear-view mirror according to claim 3, wherein the inner diameter of the light-orienting tube bulges at an intermediate portion in the axis direction.

6. The vehicle rear-view mirror according to claim 3, wherein:

the mirror element has the semi-transmissive reflective film formed of a dielectric multilayer film, the mirror element has a characteristic that exhibits one reflection peak in a visible light range; and indication light entering the mirror element has a light intensity peak in a band in which the transmittance of the mirror element is higher than the reflectance of the mirror element.

7. The vehicle rear-view mirror according to claim 2, wherein:

the mirror element has the semi-transmissive reflective film formed of a dielectric multilayer film, the mirror element has a characteristic that exhibits one reflection peak in a visible light range; and indication light entering the mirror element has a light intensity peak in a band in which the transmittance of the mirror element is higher than the reflectance of the mirror element.

8. The vehicle rear-view mirror according to claim 1, wherein the area of the front end-side opening of the light-orienting tube in a direction perpendicular to the axis is larger than the area of an rear end-side opening of the light-orienting tube in a direction perpendicular to the axis.

9. The vehicle rear-view mirror according to claim 8, wherein the inner diameter of the light-orienting tube gradually becomes larger from the rear end side to the front end side.

10. The vehicle rear-view mirror according to claim 8, wherein the inner diameter of the light-orienting tube bulges at an intermediate portion in the axis direction.

11. The vehicle rear-view mirror according to claim 8, wherein:

the mirror element has the semi-transmissive reflective film formed of a dielectric multilayer film, the mirror element has a characteristic that exhibits one reflection peak in a visible light range; and indication light entering the mirror element has a light intensity peak in a band in which the transmittance of the mirror element is higher than the reflectance of the mirror element.

12. The vehicle rear-view mirror according to claim 1, wherein the light-orienting tube is configured by being molded integrally with the mask member or a mirror holder arranged behind the mask member.

13. The vehicle rear-view mirror according to claim 1, wherein:

the mirror element has the semi-transmissive reflective film formed of a dielectric multilayer film, the mirror element has a characteristic that exhibits one reflection peak in a visible light range; and indication light entering the mirror element has a light intensity peak in a band in which the transmittance of the mirror element is higher than the reflectance of the mirror element.

14. The vehicle rear-view mirror according to claim 1, wherein: the light source is an LED; and a light diffusion plate is arranged between the light source and the indication mask.

15. The vehicle rear-view mirror according to claim 1, wherein: the light source is a white lamp; and a band-pass filter and a light diffusion plate are arranged between the light source and the indication mask.

16. The vehicle rear-view mirror according to claim 1, wherein the light source is an electroluminescence element.

* * * * *